US012684179B2

(12) United States Patent
Zhang et al.

(10) Patent No.: US 12,684,179 B2
(45) Date of Patent: Jul. 14, 2026

(54) DETERMINING WATCH TIME LOSS REGIONS IN MEDIA CONTENT ITEMS

(71) Applicant: Google LLC, Mountain View, CA (US)

(72) Inventors: Wenbo Zhang, Mountain View, CA (US); Kartikey Gupta, San Mateo, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/956,338

(22) Filed: Nov. 22, 2024

(65) Prior Publication Data

US 2025/0088682 A1      Mar. 13, 2025

Related U.S. Application Data

(63) Continuation of application No. 18/428,359, filed on Jan. 31, 2024, now Pat. No. 12,192,544, which is a
(Continued)

(51) Int. Cl.
*H04N 21/234* (2011.01)
*H04N 21/25* (2011.01)
(Continued)

(52) U.S. Cl.
CPC . *H04N 21/23418* (2013.01); *H04N 21/23424* (2013.01); *H04N 21/251* (2013.01);
(Continued)

(58) Field of Classification Search
CPC ....... H04N 21/23418; H04N 21/23424; H04N 21/251; H04N 21/26241; H04N 21/44222;
(Continued)

(56) References Cited

U.S. PATENT DOCUMENTS 8,782,691 B1 * 7/2014 Noble .................. H04N 21/258
8,959,540 B1 * 2/2015 Gargi ...................... H04N 7/16
(Continued)

FOREIGN PATENT DOCUMENTS

CN      107852496 A      3/2018
CN      109902446 A      6/2019
(Continued)

OTHER PUBLICATIONS

International Search Report and Written Opinion in International Appln. No. PCT/US2021/043487, mailed on May 23, 2022, 13 pages.
(Continued)

*Primary Examiner* — Anthony Bantamoi
(74) *Attorney, Agent, or Firm* — Fish & Richardson P.C.

(57) ABSTRACT

Methods, systems, and apparatus, including computer programs encoded on a computer storage medium, for determining watch time loss regions in media content items. In one aspect, features for a video are input into a trained model that is trained to output watch time loss regions. The trained model is trained using labels corresponding to known watch time loss regions in training videos and features of training videos that correspond to the known watch time loss regions. A watch time loss region defines a time window of a video during which a likelihood of a user stopping playback of the video is more than a threshold likelihood. In response to inputting the feature for the first video into the trained model, data regarding watch time loss regions for the video is obtained from the model and provided to an entity involved in providing the video to a user.

18 Claims, 7 Drawing Sheets

Related U.S. Application Data continuation of application No. 17/928,230, filed as application No. PCT/US2021/043487 on Jul. 28, 2021, now Pat. No. 11,949,924.

(51) Int. Cl.

| | |
|---|---|
| *H04N 21/262* | (2011.01) |
| *H04N 21/442* | (2011.01) |
| *H04N 21/854* | (2011.01) |

(52) U.S. Cl.
CPC . *H04N 21/26241* (2013.01); *H04N 21/44222* (2013.01); *H04N 21/854* (2013.01)

(58) Field of Classification Search
CPC ............. H04N 21/854; H04N 21/6582; H04N 21/4666; H04N 21/44008; G06N 3/08; G06N 3/0442; G06N 3/044; G06N 3/048; G06V 10/774; G06V 10/806; G06V 10/82; G06V 20/46
See application file for complete search history.

(56) References Cited

U.S. PATENT DOCUMENTS

| | | | | |
|---|---|---|---|---|
| 9,659,218 | B1 | 5/2017 | Shetty et al. | |
| 9,681,158 | B1 | 6/2017 | Gargi et al. | |
| 9,736,503 | B1 | 8/2017 | Bakshi et al. | |
| 9,820,004 | B1 * | 11/2017 | Foerster ............... | H04N 21/488 |
| 10,856,022 | B2 | 12/2020 | Bapna et al. | |
| 2017/0311035 | A1 | 10/2017 | Lewis et al. | |

FOREIGN PATENT DOCUMENTS

| | | |
|---|---|---|
| CN | 112966607 A | 6/2021 |
| JP | 2014-072826 | 4/2014 |
| JP | 2019-146142 | 8/2019 |
| JP | 2020-155795 | 9/2020 |

OTHER PUBLICATIONS

Notice of Allowance in Japanese Appln. No. 2022-580975, mailed on Apr. 8, 2024, 5 pages (with English translation).
Office Action in European Appln. No. 21758238.6, mailed on Jan. 26, 2024, 4 pages.
Office Action in Korean Appln. No. 10-2022-7045961, mailed on Jul. 10, 2024, 11 pages (with English translation).
Wu et al., "Beyond views: Measuring and predicting engagement in online videos." Twelfth international AAAI conference on web and social media, Apr. 2018, 10 pages.
Notice of Allowance in Korean Appln. No. 10-2022-7045961, mailed on Mar. 10, 2025, 4 pages (with English translation).
Notice of Allowance in Japanese Appln. No. 2024-075258, mailed on May 27, 2025, 5 pages (with English translation).
Office Action in Indian Appln. No. 202227070904, mailed on Jun. 2, 2025, 6 pages (with English translation).
Office Action in Chinese Appln. No. 202180046570.2, mailed on Feb. 11, 2026, 15 pages (with English translation).
Office Action in Chinese Appln. No. 202180046570.2, mailed on Oct. 14, 2025, 15 pages (with English translation).
Office Action in European Appln. No. 21758238.6, mailed on Sep. 26, 2025, 8 pages.

* cited by examiner

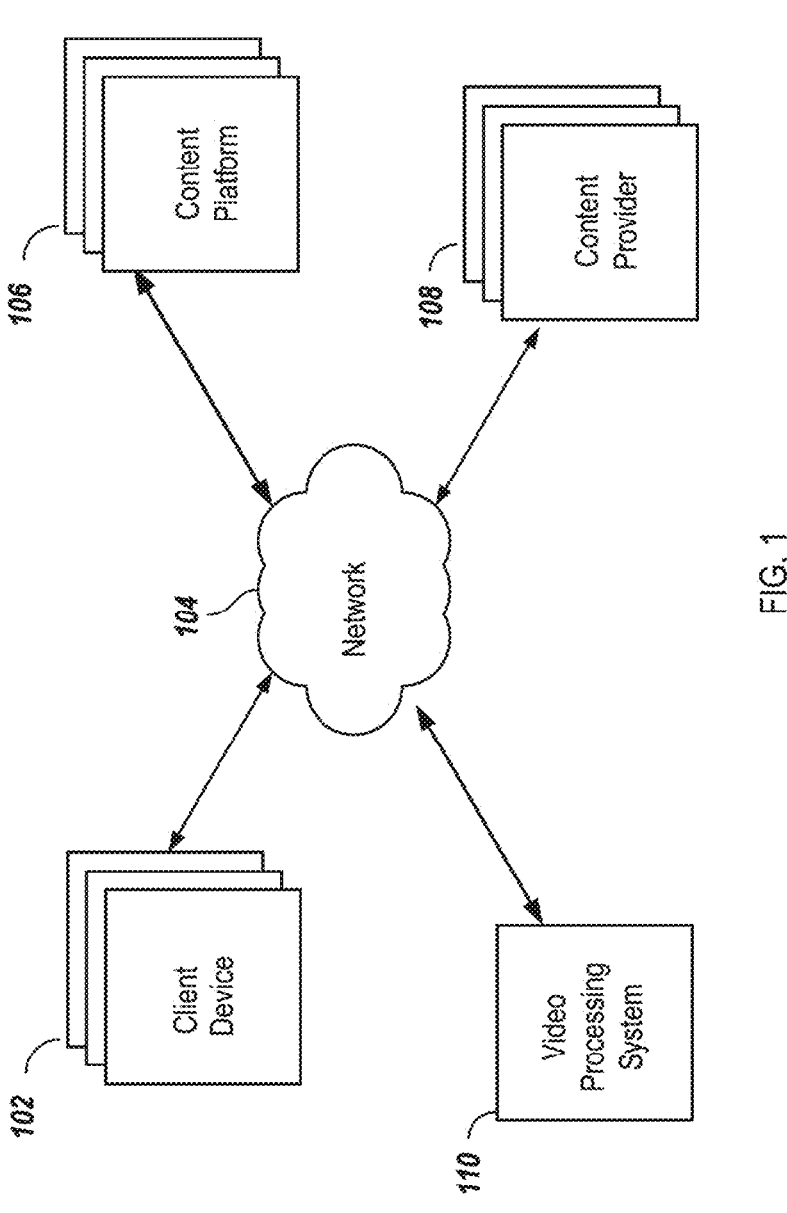
FIG. 1

400

402   # Find watch time loss regions in the video using the average slope of the curve 404   average_watch_time = (watch_time$_{t_{end}}$ - watch_time$_{t_0}$)/video_length = 1/video_length 406   for $t_1$ to $t_{end}$:

408   if watch_time$_{t_i}$ - watch_time$_{t_{i-1}}$ > average_watch_time:

410   add $t_i$ to watch_time_loss_region

412   # Remove continuous watch time loss regions from the start and the end of the video 414   for $t_i$ in watch_time_loss_region:

416   if $t_{i+1}$ in watch_time_loss_region:

418   remove $t_i$ from watch_time_loss_region else break   420

422   for $t_i$ in reverse(watch_time_loss_region):

if $t_{i-1}$ in watch_time_loss_region:

remove $t_i$ from watch_time_loss_region else break

FIG. 4

Receive a first video — 602

Determine a set of features for the first video — 604

Input the set of features for the first video into a trained model — 606

Use the trained model to identify watch time loss regions for the first video — 608

Provide information for the identified watch time loss regions — 610

FIG. 6    600

DETERMINING WATCH TIME LOSS REGIONS IN MEDIA CONTENT ITEMS

CROSS-REFERENCE TO RELATED APPLICATION

This application is a continuation of U.S. patent application Ser. No. 18/428,359, filed Jan. 31, 2024, which is a continuation of pending U.S. patent application Ser. No. 17/928,230, filed Nov. 28, 2022, now, U.S. Pat. No. 11,949,924, issued Apr. 2, 2024, which is a National Stage Application under 35 U.S.C. § 371 of International Application No. PCT/US2021/043487, filed on Jul. 28, 2021. The disclosure of the prior applications are considered part of and are incorporated by reference in the disclosure of this application.

BACKGROUND

This specification generally relates to data processing as well as determining watch time loss regions in media content items.

Videos that are streamed to a user can include one or more digital components that are generally overlaid on top of the original video stream. The overlaid content may be provided to the user within a rectangular region that overlays a portion of the original video screen. The digital components can also include in-stream content that is played before, during, or after the original video stream.

As used throughout this document, the phrase "digital component" refers to a discrete unit of digital content or digital information (e.g., a video clip, audio clip, multimedia clip, image, text, or another unit of content). A digital component can electronically be stored in a physical memory device as a single file or in a collection of files, and digital components can take the form of video files, audio files, multimedia files, image files, or text files. For example, the digital component may be content that is intended to supplement content of a video or other resource. More specifically, the digital component may include digital content that is relevant to resource content (e.g., the digital component may relate to a topic that is the same as or otherwise related to the topic/content on a video). The provision of digital components can thus supplement, and generally enhance, the web page or application content.

SUMMARY

In general, one innovative aspect of the subject matter described in this specification can be embodied in methods including the operations of: receiving a first video; determining a set of features for the first video; inputting the set of features for the first video into a trained model, wherein (1) the trained model is trained to output watch time loss regions in a particular video, (2) the trained model is trained using labels corresponding to known watch time loss regions in a plurality of training videos and features of the plurality of training videos that correspond to the known watch time loss regions, and (3) a watch time loss region for a particular video defines a time window of the particular video during which a likelihood of a user stopping playback of the particular video is more than a threshold likelihood; in response to inputting the set of feature for the first video into the trained model, obtaining, from the trained model, data regarding watch time loss regions for the first video; and providing, to an entity involved in providing the first video to a user, the data regarding the watch time loss regions for the first video. Other embodiments of this aspect include corresponding methods, apparatus, and computer programs, configured to perform the actions of the methods, encoded on computer storage devices. These and other embodiments can each optionally include one or more of the following features.

Particular embodiments of the subject matter described in this specification can be implemented to realize one or more of the following advantages. The techniques described in this specification enable identification of watch time loss information in videos, which can be used to determine placements of digital components within a video stream such that the digital components are more likely to be viewed/played by user during playback of the video. Without accounting for watch time loss regions, digital components may be placed within portions of the video occurring after a watch time loss region, which increases the likelihood of the digital components not being played. This in turn results in in wasting of computing resources to provide and receive the digital components that are not ultimately consumed by a user. In contrast, by accounting for a video's watch time loss regions when placing digital components to be displayed/played during the video, the likelihood of the digital components being played during video playback increases, which in turn results in the computing resources required to provide and receive the digital components not being wasted. In further detail, a media content system achieve resource savings by selecting digital component playback time points that are before determined watch time loss regions. By selecting digital component playback placements before watch time loss regions, a likelihood of providing a digital component that is not consumed is reduced (or conversely, the likelihood of consuming the digital component is increased).

The watch time loss region information can be used for other purposes. For example, watch time loss information can be provided to a media content item owner. The media content item owner may be interested in knowing during which portion(s) of a content item users are more likely to abandon playback of the content item. By surfacing watch time loss information to the content item owner, the content item owner can become aware of watch time loss regions. Accordingly, the content item owner may decide to rework or adjust the media content item to reduce or alter the watch time loss regions of the media content item. An adjusted media content item that includes less or shorter watch time loss regions will be consumed by users, over time, in greater proportions than a media content item with more or longer watch time loss regions. Accordingly, providing the media content item with fewer and/or shorter watch time loss regions is more resource efficient, because wasting of resources (e.g., providing resources that are not consumed) will be reduced, over time.

Additionally, accounting for a video's watch time loss regions when placing and providing digital components within the video can result in increased viewership of the video and the associated digital components (as compared to viewership stemming from placement and provision of digital components that does not account for watch time loss regions). This in turn can result in more revenue from digital components by virtue of them being actually consumed/viewed by users (as opposed to being ignored or missed by users owing to their placement in the video without accounting for watch time loss regions).

Watch time loss region information can also be used to optimize serving or other processing of media content and digital components to be presented with the media content. For example, a first set of digital components that is scheduled to be played with a video before a determined watch time loss region may be sent by a content provider to a client device on a priority basis (e.g., before the first set of digital components is scheduled to be played and possibly even with the provision of the video). Other set(s) of digital components that are scheduled to be played after a first determined watch time loss region may be provided by the content provider on an on-demand basis (e.g., right when the digital component is scheduled to be played). For example, since some users tend to stop watching the video during each watch time loss region, the content provider can provide certain high priority digital components before the first watch time loss region and lower priority digital components before each subsequent watch time loss region. As will be appreciated, this results in a more efficient use of resources in that digital components scheduled to be played after a watch time loss region can be provided by the content provider only if the video is played back, or only if the user has not stopped playback before a particular digital component is needed.

The machine learning approaches described in this specification can achieve technical advantages that are not otherwise possible. A media content system can provide, for example, billions of content items. Manually determining watch time loss regions and determining digital component placements for billions of content items is not feasible. Rather than using a manual approach to determine watch time loss regions, the machine learning system described in this specification can be used to analyze media content items and automatically determine watch time loss regions in the media content items. Additionally, the machine learning system can automatically predict watch time loss regions for media content items for which little or no user interaction data exists. Without use of the machine learning system, a substantial amount of user interaction data would have to be collected, using a substantial amount of resources, to be able to directly calculate watch time loss information. Use of the machine learning system can enable prediction of watch time loss information, even for newly-created videos, without waiting for or expending resources for user interaction data collection and processing of real world data.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 1 is a block diagram of an example environment in which digital content is distributed and provided for display on client devices.

FIG. 4 illustrates example pseudo-code for determining watch time loss regions.

4

Figure 7:
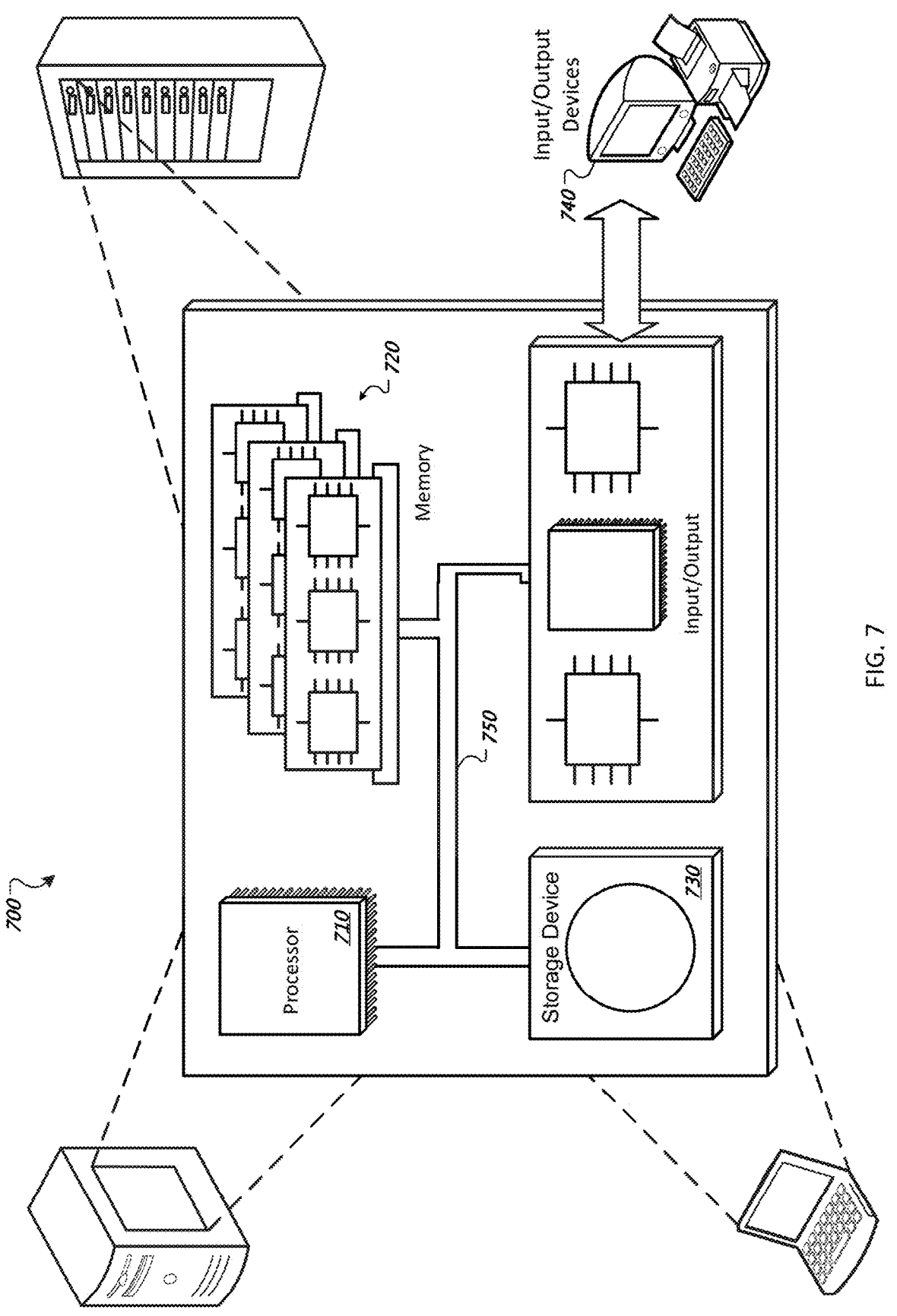

FIG. 7 is a block diagram of an example computer system that can be used to perform operations described.

DETAILED DESCRIPTION

This specification generally relates to determining watch time loss regions in media content items. A media content system can provide media content (e.g., video content, audio content) to viewers. Users, in general, may not consume a media content item from start to completion. For various reasons, a user may leave or abandon playback of the media content item at a time point before completion of the media content item. Timeframes of media content item playback in which a user may be likely to abandon the playback can be referred to as watch time loss regions. As another definition, a watch time loss region for a particular video can describe a time window of the particular video in which a likelihood of a user stopping playback of the particular video in the time window is more than a threshold likelihood.

As summarized below and described throughout this specification, the techniques described in this petition enable automatic determination of predicted watch time loss regions for an input video using a trained watch time loss model. The watch time loss model can be trained by a model trainer using a set of training videos. For each training video, a watch time loss curve can be generated for the training video by a watch time loss curve generator based on user interaction data (e.g., video session start/stop times) for the training video. Watch time loss regions can be determined in the watch time loss curves generated for the training videos by a watch time loss region identifier. The watch time loss region identifier can determine an average slope of a watch time loss curve and identify watch time loss regions by determining regions of the watch time loss curve that have a slope that is greater than the average slope. The watch time loss model can be trained based on the watch time loss regions determined for the training videos. In particular, the watch time loss model can be trained based on the determined watch time loss regions for the training videos and the features of the training videos that occur within a predetermined time window of the watch time loss region (which can be determined by a feature extractor, for example).

The trained watch time loss model can be used to predict watch time loss regions for an input video. The input video can be a video for which little or no user interaction data exists, for example. The feature extractor can determine a set of features for the input video and input the set of features for the input video into the trained watch time loss model. The trained watch time loss model can output data regarding predicted watch time loss regions for the input features of the input video. The data regarding predicted watch time loss regions can include start and stop times of the predicted watch time regions, a count of watch time regions in a video, a total duration of watch time loss regions in the video, or a percentage of the length of the video that corresponds to identified watch time loss regions.

The data regarding the predicted watch time loss regions for the input video can be used for various purposes. For example, the data regarding the predicted watch time loss regions for the input video can be provided to a content provider that uses the data regarding the watch time loss regions for the first video to determine time points in the input video at which to play digital components. For example, the content provider can select digital component playback time points in the input video that are before determined watch time loss regions, which can achieve various types of resource savings, as described above. As another example, the data regarding the predicted watch time loss regions can be provided to an owner of the input video. The owner of the input video can choose to modify the input video to reduce a count or duration of watch time loss regions. Accordingly, an updated input video may be more likely to be consumed to completion or to a later time point, which can result in resource efficiencies with respect to expending resources on providing content which is actually consumed. These features and additional features and benefits are further described in greater detail below with reference to FIGS. 1-7.

Further to the descriptions throughout this document, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally-identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

FIG. 1 is a block diagram of an example environment 100 in which digital content is distributed and provided for display on client devices. The example environment 100 includes a network 104. The network 104 can include a local area network (LAN), a wide area network (WAN), the Internet, or a combination thereof. The network 104 can also include any type of wired and/or wireless network, satellite networks, cable networks, Wi-Fi networks, mobile communications networks (e.g., 3G, 4G, and so forth), or any combination thereof. The network 104 can utilize communications protocols, including packet-based and/or datagram-based protocols such as internet protocol (IP), transmission control protocol (TCP), user datagram protocol (UDP), or other types of protocols. The network 104 can further include a number of devices that facilitate network communications and/or form a hardware basis for the networks, such as switches, routers, gateways, access points, firewalls, base stations, repeaters or a combination thereof.

The network 104 connects client devices 102, content platforms 106, content providers 108, and a video processing system 110. The example environment 100 can include many different content platforms 106, video processing systems 110, client devices 102, and content providers 108.

A content platform 106 is a computing platform (such as, e.g., a network server or another data processing apparatus described with reference to FIG. 7) that enables distribution of content. Example content platforms 106 include search engines, social media platforms, video sharing platforms, new platforms, data aggregator platforms, or other content sharing platforms. Each content platform 106 may be operated by a content platform service provider.

The content platform 106 can publish and make available its own content. For example, the content platform 106 may be a news platform, which publishes its own news articles. The content platform 106 may also display content provided by one or more content providers 108 that are not part of the content platform 106. In the above example, the news platform may also display third party content provided by one or more content providers 108. As another example, the content platform 106 may be a data aggregator platform that does not publish its own content, but aggregates and displays third party content provided by different content providers 108.

In some implementations, a content platform 106 may store certain information about a client device (e.g., device preference information, content consumption information, etc.). Such user information may be used by the content platform, e.g., to tailor the content that is provided to the client device 102 or to enable ready access to particular content that is frequently accessed by the client device 102. In some implementations, the content platform 106 may not store such device information on the platform; however, the content platform 106 may nevertheless provide such information for storage on a particular server (separate from the content platform). The content platform 106 (also referred to herein as content platform/server 106 or simply server) thus refers to a content platform that stores such device information or a server (separate from the content platform) that stores such device information.

In some implementations, the content platform 106 is a video service through which users can view streamed video content. Videos that are streamed to a user can include one or more digital components (e.g., provided by a content provider 108) that are overlaid on top of the original video stream. For example, it can be generally desirable to provide overlaid content on an underlying video stream, to provide digital component(s) to a viewer of the video stream and to improve the quantity of content delivered within the viewing area for a given video streaming bandwidth. In addition or alternatively to video streaming scenarios, the content platform 106 can include a video processor that processes a video file, to modify the video file to include overlaid content, with the processed video file with the overlaid content being provided to the client device 102 for display on the client device 102.

The video processing system 110 can determine predicted watch time loss regions for a given video and provide watch time loss region information (as summarized above and as further described with reference to FIGS. 2-6) to different entities or systems. For example, the video processing system 110 can provide information/data regarding watch time loss regions to the content provider 108, so the content provider can schedule digital components before predicted watch time loss regions. As another example, watch time loss information can be provided to a client device 102 of the owner of the video, as feedback for the video. The owner may adjust the video based on watch time loss information, for example.

In some implementations, the video processing system 110 uses a trained model to generate the watch time loss information (as summarized here and further described with reference to FIGS. 2, 5, and 6). That is, the trained model can be trained to output watch time loss regions in a particular input video. The trained model can be trained using known watch time loss regions in a plurality of training videos and features of the plurality of training videos that correspond to the known watch time loss regions. Once the model is trained, an input video can be processed by the video processing system 110 using the trained model. A set of features (e.g., video features, audio features, semantic features) can be determined for the input video and the features can be provided to the trained model. The trained model can identify watch time loss regions in the input video. Additional structural and operational aspects of these components of the example environment 100 are described below with reference to FIGS. 2 to 7.

Figure 2:
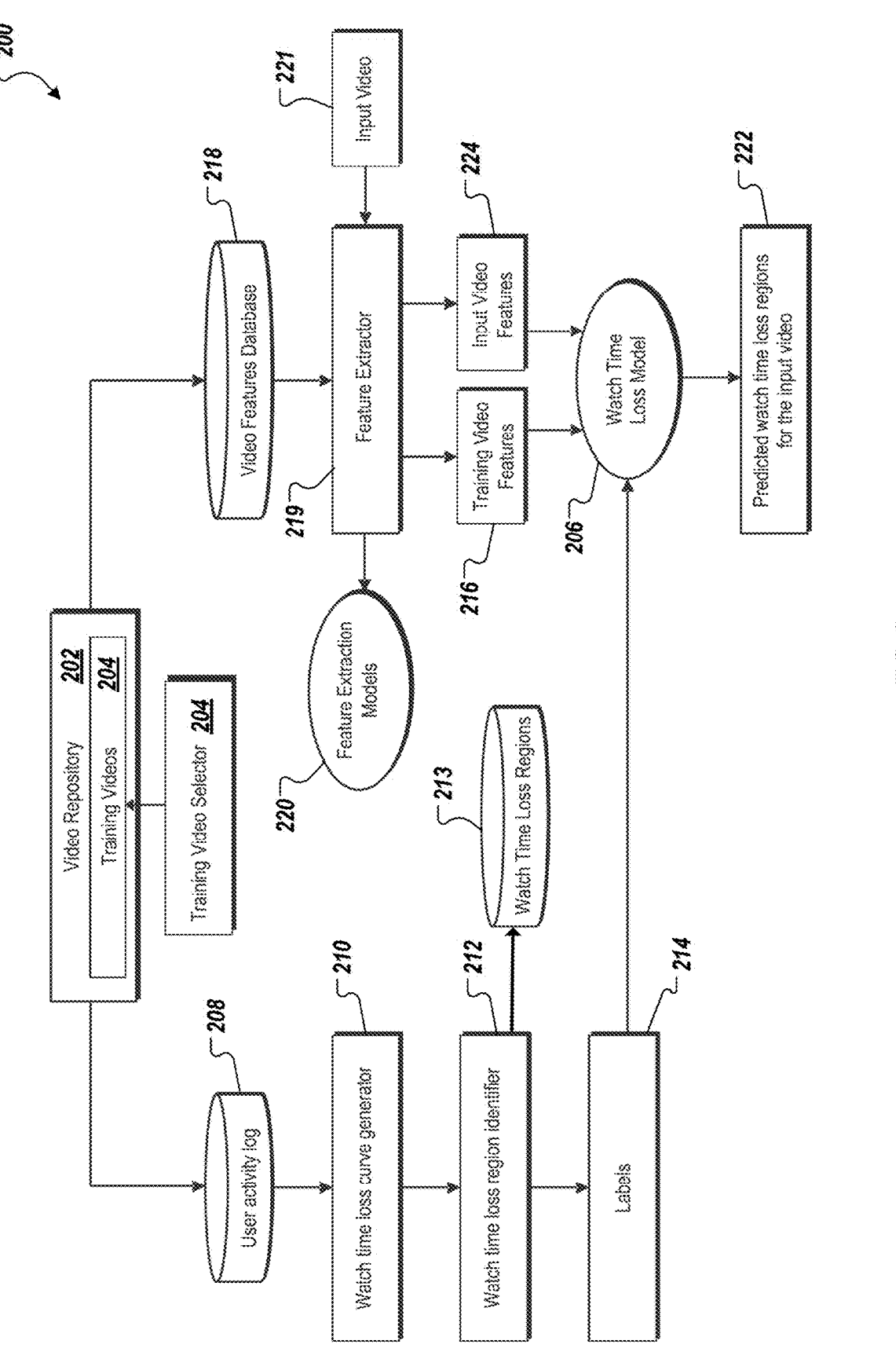
FIG. 2 illustrates an example system for determining watch time loss regions in media content items.

FIG. 2 illustrates an example system 200 for determining watch time loss regions in media content items. The system 200 depicts, e.g., the components of the above-described video processing system 110, which are described below. Each of the components of the system 200 are software components that include instructions that are executed by a processing entity such as a processor.

A video repository 202 (e.g., database or other storage device) includes videos managed, for example, by the content platform 106. A set of training videos 204 can be selected, (e.g., by an administrator or a training video selector 205) from the video repository 202, for training of a watch time loss model 206. In some implementations, the training videos 204 can be selected (e.g., by the administrator or the training video selector 205) from the video repository 202 based on a number of views. For example, the more views a particular video has had, the more interaction data (described below) exists for the video (e.g., stored in a user activity log 208). Accordingly, the training videos 204 can include a top X number of most-watched videos, or can include videos that have been watched at least Y number of times, for example. By selecting the most-watched videos, watch time loss curves generated by a watch time loss curve generator 210 can be based on a largest amount of interaction data (as further described below with reference to FIGS. 3-4).

The interaction data included in the user activity log 208 can include start and stop time information that indicates, for each video-viewing session of a video, a start time when users started watching the video and an end time when users ended their video-watching session. The end time may correspond to the end of the video or may be a time point before the end of the video. In addition to start and stop time information, the user activity log can also include other types of data, such as user interactions with digital components in the video. The information included in the user activity log 208 can be anonymized so that no PIN (Personally Identifiable Information) is stored.

The watch time loss curve generator 210 can create a watch time loss curve for each respective training video in the training videos 204, from aggregated information for the training video that is included in the user activity log 208. An example watch time loss curve generated by the watch time loss curve generator 210 is described and depicted below with reference to FIG. 3.

Figure 3:
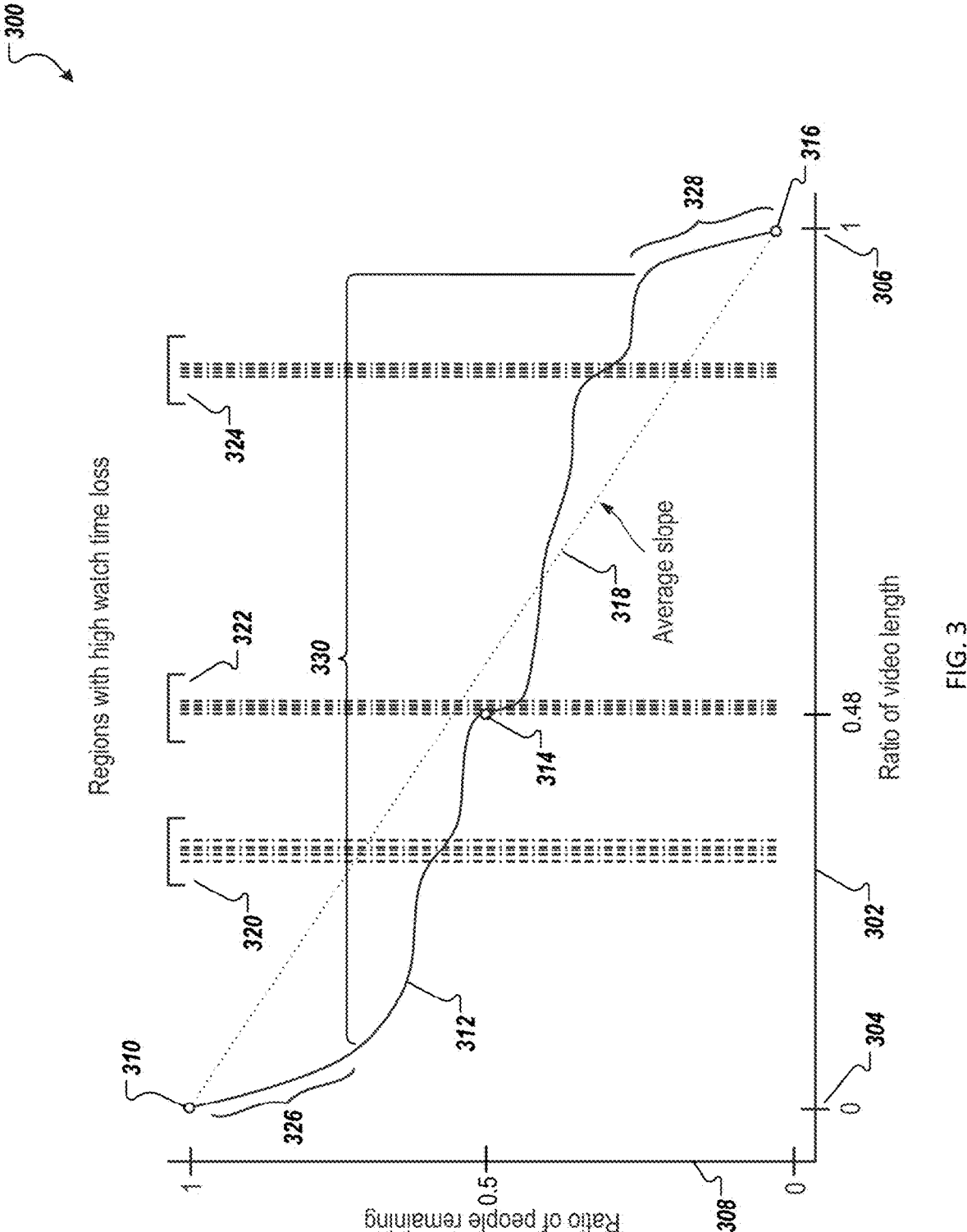
FIG. 3 illustrates an example watch time loss graph for a video.

FIG. 3 illustrates an example watch time loss graph 300 for a video. The video can be one of the training videos 204 described above with respect to FIG. 2.

As shown in FIG. 3, an X-axis 302 corresponds to a video-length ratio. For example, a value of 0 (labeled 304) on the X-axis corresponds to the start of the video and a value of 1 (labeled 306) on the X-axis corresponds to the end of the video. A Y-axis 308 corresponds to a ratio of viewers of video sessions for the video who are still watching the video at a given video time point. For example, for a point 310 on a watch time loss curve 312, a value of 1 on the Y-axis and a value of 0 on the X-axis indicates that 100% of viewers are watching the video at the start of their video-watching sessions. For a point 314, a value of 0.5 on the Y-axis and a value of 0.48 on the X-axis indicates that 50% of the viewers remain and continue watching the video by the time 48% of the video has finished/elapsed. In other words, this point on the watch time loss curve also indicates that 50% of the viewers have stopped watching the video by the time 48% of the video has finished/elapsed. For a point 316, a value of 0.08 on the Y-axis and a value of 1 on the X-axis indicates that 8% of viewers watched the video until the very end of the video.

Referring again briefly to FIG. 2, a watch time loss region identifier 212 can identify watch time loss regions of training videos 204 based on the watch time loss curves created by the watch time loss curve generator 210. Identified watch time loss region information can be stored by the watch time loss region identifier 212 in a watch time loss region repository 213. The watch time loss region identifier 212 can, for a given watch time curve of a video, identify watch time loss regions as portions of the curve where the slope of the curve is greater than the average slope of the entire curve.

For example and referring again to FIG. 3, an average slope has been determined by the watch time loss region identifier 212 for the watch time loss curve 312. The average slope is represented in the graph 300 by a line 318. Identified watch time loss regions 320, 322, and 324 correspond to regions of the watch time loss curve 312 where the slope of the watch time loss curve 312 is greater than the average slope. A greater than average slope and an identified watch time loss region 320, 322, or 324 can correspond to a significant drop-off in viewers at those time windows of the video, for example. Information for identified watch time loss regions, such as information for the identified watch time loss regions 320, 322, and 324, can be stored by the watch time loss region identifier 212, in the watch time loss region repository 213.

Additional details regarding determination of watch time loss regions by the watch time loss region identifier 212 is discussed below with respect to FIG. 4.

FIG. 4 illustrates example pseudo-code 400 for determining watch time loss regions. Code corresponding to the pseudo-code 400 can be executed by a processor and can be provided by the watch time loss region identifier 212 described above with respect to FIG. 2, for example. A first section 402 includes pseudo-code for finding watch time loss regions in a video using an average slope approach.

A line of code 404 includes code for determining an average watch time. Watch time refers to the value of the y-axis of a watch time loss curve such as the watch time loss curve 312. Watch time is equivalent to the ratio of people remaining (e.g., people still watching the video at a certain time point). The ratio of people remaining (e.g., the count of people remaining divided by the total number of people) has a starting value at the start of the video of 1 and the ratio of people remaining value at the end of the curve is 0. Accordingly, the slope of the line joining the starting and ending points of the curve can be calculated as 1 (e.g., the change in y) divided by the video length (e.g., change in x).

A line of code 406 starts an iteration construct in which each time point (e.g., each second) of the video is processed and iterates through the instructions encapsulated by lines of code 408 and 410 (which are described below).

In a line of code 408, a determination is made as to whether a difference between a watch time of a current time point and a watch time of an immediately preceding previous time point is greater than the average watch time. The line of code 408 is equivalent to determining whether the slope of the watch time loss curve between the current time point and the immediately preceding previous time point is greater than the average slope. The line of code 408 also corresponds to determining whether the local derivative of the watch time loss curve at the current time point is less than the average slope. At line 410, if the difference between the watch time of the current time point and the watch time of the immediately preceding previous time point is greater than the average watch time, the time point is added to a watch time loss region. For example, when a first time point is to be added to a watch time loss region, a new watch time loss region can be "opened" as a current watch time loss region and the time point can be added to the current watch time loss region. Subsequent consecutive time points can be added to the current watch time loss region as long as the determination in the line of code 408 returns true for those time point(s). Once the determination in the line of code 408 returns false for a time point, the current watch time loss region can be closed. Information for the closed watch time loss region can be stored in the watch time loss region repository 213 by the watch time loss region identifier 212 as corresponding to an identified watch time loss region. If the determination in the line of code 408 returns true for a subsequent time point, another watch time loss region can be opened as the current watch time loss region.

Referring again to FIG. 3, for video content in general (e.g., for most, all, or nearly all videos), a relatively sharp drop-off in slope may occur in a watch time loss curve at time points corresponding to the beginning and end of the video, as compared to the average slope. For example, a certain portion of users may abandon the video near the beginning of the video if the video does not include expected or desired content, for example. As another example, a certain portion of users may watch the video to the end or near to the end but may generally abandon the video as the video nears completion. As illustrated in FIG. 3, curve portions 326 and 328 at the beginning and end of the watch time loss curve 312, respectively, have a relatively steep slope as compared to the average slope. The slope of a flatter middle portion 330 of the watch time loss curve 312 is generally lower than the average slope of the overall watch time loss curve 312 due to the greater slopes at the beginning and the end of the watch time loss curve 312. Accordingly, if the slope increases in regions of the flatter middle portion 330 (e.g., as in the watch time loss regions 320, 322, and 324) and becomes higher than the average slope, the watch time loss region identifier 212 can identify those regions as watch time loss regions. Users abandoning a video in watch time loss regions in the flatter middle portion 330 may do so due to features of the video. Features are described in more detail below.

Since most (if not all or nearly all) watch time loss curves for all videos exhibit sharp slope drops at the beginning and end, as compared to the average slope, beginning and ending video portions can be considered uninteresting with respect to watch time loss region identification, since the majority of all watch time loss curves exhibit such behavior. Accordingly, watch time loss regions at the start and end of the video can be excluded from being identified by the watch time loss region identifier 212 for purposes of training the watch time loss model 206. Additional details regarding exclusion of watch time loss regions is discussed below with respect to FIG. 4.

Referring again to FIG. 4, a section 412 corresponds to exclusion (e.g., removal) of continuous watch time loss regions from the start of the video and a section 422 corresponds to removal of continuous watch time loss regions from the end of the video. Watch time loss curves typically have a relatively sharp drop off at the beginning and end of the video. In some implementations, a first watch time loss region that occurs at the start of the video and a last watch time loss region that occurs at the end of the video are removed by the watch time loss region identifier 212 as identified watch time loss regions. In other implementations, initial and ending watch time loss regions may be removed using time point by time point analysis, as described below for lines 412-422.

For example, a line 414 starts an iteration construct that analyzes time points from the start of the video (i.e., $t_i=t_1$). At line 416, for a current time point ($t_i$), a determination is made as to whether a next time point ($t_{i+1}$) is in a first watch time loss region (e.g., a region that has been identified by the watch time loss region identifier 212 as a watch time loss region by virtue of operation of code lines 406-410). At line 418, if the next time point is in a watch time loss region, the current time point is removed from the watch time loss region. At line 420, once a next time point is not in a watch time loss region, the iteration construct is exited. Removing beginning time points from an initial watch time loss region can effectively result in delaying the beginning consideration of time points for watch time loss regions until a watch time loss curve begins to flatten after the initial sharp drop off. A line 422 starts an iteration construct that includes similar logic to the iteration construct that starts on line 414, but for processing time points of the video in reverse starting with a last time point.

In some implementations and/or for some videos, different approaches can be used to reduce the number of identified watch time loss regions. Watch time loss region reduction approaches can be used when more than a predetermined threshold of regions are identified for a video, for example. In some implementations, time points can be filtered out of watch time loss regions using a high percentile value of the derivative to create a more refined list of watch time region candidates that includes only regions with the steepest slopes. For example, a predetermined number of regions with the steepest slopes can be identified as watch time loss regions as long as each of those regions is steeper than the average slope. As another example, second derivatives can be calculated (e.g., at each time point) and used to create a more refined set of identified watch time loss regions. For example, watch time loss curve regions where the second derivative is negative can be selected as watch time loss regions and watch time loss curve regions where the second derivative is not negative can remain unselected as watch time loss regions.

Watch time loss regions identified by the watch time loss region identifier 212 can be used as labels 214 by a model trainer 215 when the model trainer 215 trains the watch time loss model 206. For defining the labels 214, the following equation can be used, where i represents a given region of a watch time loss curve generated by the watch time loss curve generator 210:

$$y^{(i)}=1 \text{ if a watch time loss region;else } 0 \qquad \text{Target label:}$$

The watch time loss model 206 can also be trained by the model trainer 215 using features 216 of the training videos 204 that are retrieved from a video features database 218 and/or determined by a feature extractor 219. The features 216 that are used to train the watch time loss model 206 can include features that occur in the training videos 204 within a predetermined time window of time points that are included in identified watch time loss regions. For example, the predetermined time window can include time points that are a configurable X seconds before and after a time point in a watch time loss region, for example (e.g., X can be fifteen seconds, six seconds, nine seconds, or some other value). The model trainer 215 can train the watch time loss model 206 based on an assumption that features that are within the predetermined time window of a watch time loss region may be predictive of a watch time loss region. In general, different machine learning approaches can be used in the watch time loss model 206 to generate predicted watch time loss regions. For example, the watch time loss model 206 can be a supervised, offline model. In such a model, the supervised machine learning model is trained using the determined features of the videos and the corresponding label identifying the watch time loss regions in the video (additional details regarding the model training are described below with reference to FIGS. 5 and 6 below). As such, one or more machine learning approaches that result in a most accurate prediction can be used. An example architecture for the watch time loss model 206 is described below with respect to FIG. 5.

The features 216 that are used by the model trainer 215 to train the watch time loss model 206 can include various types of features, such as audio features and video features. The feature extractor 219 can identify features for each second of the video and/or each frame of the video, based on different feature extraction models 220. The feature extraction models 220 can include image models and audio models, for example. Audio features can correspond to various classes of sounds and can be determined by the feature extractor 219 using one or more audio models. The audio features can include embeddings and annotations related to audio information in the video. Video data can be processed, e.g., using color space approaches, object detection, and/or other approaches. Video features can correspond to color space characteristics, a presence or absence of an object, etc. The features 216 can include annotated features that identify semantic information about particular frame(s), such as objects or semantic entities that have been identified in the audio and/or video data. Video features identified by the feature extractor 219 can include frame annotations generated using semantic models included in the feature extraction models 220, for example. For instance, for a frame of a video where a person is riding a bike, a semantic model might generate annotations of "biking" and "athlete." Other features can include derivative features, such as most common annotations in the video. Some features can be raw embedding features. Raw embedding features are features that describe the appearance of the video that have been generated by image understanding models. Raw embedding features can capture visual/semantic concepts and similarities in frames or images.

In some implementations, rather than having the feature extractor 219 use separate feature extraction models 220 to extract features and provide extracted features to the watch time loss model 206, the training videos 204 are provided as input to the watch time loss model 206 and the watch time loss model 206 analyzes each frame of the training videos 204 and corresponding audio using machine learning to learn which features correspond to watch time loss models. However, using such an approach for the watch time loss model 206 may result in unacceptable use of resources for training and analysis. Full evaluation of all pixels of all frames, with the corresponding audio may add unacceptable complexity, size, and processing to the watch time loss model 206. Having the feature extractor 219 use separate feature extraction models 220 and provide extracted features to watch time loss model 206 can improve efficiency of the watch time loss model 206 and enable the watch time loss model 206 to make predictions using less training and processing resources.

Once trained by the model trainer 215 as described above, the watch time loss model 206 can be applied to an input video 221 to generate predicted watch time loss regions 222 for the input video 221. The input video 221 can be a recently-uploaded video, for example, which has little or no interaction data stored in the user activity log 208. As described in more detail below with respect to FIG. 5, features 224 of the input video 221 can be extracted by the feature extractor 219 and provided as input to the watch time loss model 206. The features 224 of the input video 221 can be similar types of features as the features 216 determined for the training videos 204. The features 224 determined for the input video 221 are then input into the trained watch time loss model 206, which uses the features 224 to generate the predicted watch time loss regions 222 for the input video 221. The watch time loss model 206 can generate a confidence score for each predicted watch time loss region 222 that represents a likelihood of the predicted watch time loss region 222 being a watch time loss region. The predicted watch time loss regions 222 can represent video portions of the input video 221 for which a confidence score is greater than a predetermined threshold, for example.

The predicted watch time loss regions 222 can be used for various purposes and/or provided to various entities. For example, the predicted watch time loss regions 222 can be used to select specific time points of a video at which to present digital components. For example, time points that are outside (i.e., time points that precede) the predicted watch time loss regions 222 can be selected as time points for presenting digital components in association with playback of the input video 221. Accordingly, the likelihood of a user abandoning playback of the digital components (and the input video 221) is reduced relative to digital component playback done after the predicted watch time loss regions. As such, resource consumption can be more efficient, since a likelihood is reduced of expending resources for content that is not viewed. Other benefits for presenting digital components before the predicted watch time loss regions 222 can be achieved, such as additional revenue that may occur from a larger number of actual views of digital components that are likely to occur by placing digital components prior to the predicted watch time loss regions 222.

As another example, the video processing system 110 can provide the predicted watch time loss regions 222 (and perhaps corresponding confidence values) to a video creator or owner (e.g., in a video studio, such as after the video creator uploads the input video 221 to the content platform 106). A presentation of watch time loss information can also include derived, aggregate, or presentation information generated by a watch time loss information generator 226. For example, the watch time loss information generator 226 can generate, for the input video 221, derived watch time loss information 228 that can include a count of the predicted watch time loss regions 222, information describing a timeline view or other presentation of where the predicted watch time loss regions 222 exist in the input video 221, and/or various other statistics or information about the predicted watch time loss regions 222. For example, the watch time loss information generator 226 can calculate a percentage of the runtime of the input video 221 that is included in the predicted watch time loss regions 222 (e.g., time included in predicted watch time regions/total length of the video). As yet another example, a video quality score for the input video 221 can be calculated by the watch time loss information generator 226 based at least on the predicted watch time loss regions 222, such as based on a total count and/or overall duration of the predicted watch time loss regions 222. Other examples can include the watch time loss information generator 226 determining information that indicates how the predicted watch time loss regions 222 for the input video 221 compare to watch time loss predictions or calculations for other videos (e.g., with respect to total count and/or duration of watch time loss regions, as compared to other videos that are similar in category, duration, or other video characteristics). The derived watch time loss information 228 can be presented, for example, to the video creator or the content provider, along with the predicted watch time loss regions 222.

The video creator can use received information for the predicted watch time loss regions 222 to adjust the input video 221 to improve the quality of the input video 221. For example, the video creator can adjust or replace video content in the predicted watch time loss regions 222, and re-upload the input video 221 to be processed again using the watch time loss model 206. The watch time loss model 206 can be used to generate new predicted watch time loss regions 222 for the input video 221. The video creator can repeat an adjust, upload, and review of predicted watch time loss regions 222 information until the video creator is satisfied with a reduction in a count and/or duration of the predicted watch time loss regions 222 for the input video 221.

By reducing a count and/or duration of predicted watch time loss regions 222 in the input video 221, the video creator can create an improved video that is more efficient with respect to utilization of resources. For example, a video that has fewer watch time loss regions will be more likely to be viewed for a longer period of time, as compared to a video with a larger number of watch time loss regions. Accordingly, resources used to provide a video to a user are less likely to be wasted, for videos with fewer watch time loss regions. Additionally, resources used for providing digital components that are provided for playback in association with playback of a video will be less likely to be wasted for videos that have fewer watch time loss regions. With fewer watch time loss regions in a video, a likelihood of digital components being played in the video at a time point corresponding to a watch time loss region is reduced.

The watch time loss model 206 can be improved over time using a feedback loop. For example, when the input video 221 is processed using the watch time loss model 206, the predicted watch time loss regions 222 for the input video 221 can be determined, as described above. Over time, the input video 221 will likely be watched by an increasing number of users, and the user activity log 208 can include an increasing amount of interaction data for the input video 221. As the interaction data for the input video 221 grows, actual watch time loss regions can be identified for the input video 221 by the watch time loss region identifier 212 (e.g., once a sufficient amount of interaction data has been gathered for the input video 221) (in the same manner as described above). The actual watch time loss regions can be compared, for example, by the model trainer 215, to the predicted watch time loss regions 222, and results of the comparison can be fed by the model trainer 215 into the watch time loss model 206, for updating of the watch time loss model 206. For example, when the actual watch time loss regions match the predicted watch time loss regions 222, confidence values or weights used by the watch time loss model 206 can be increased (e.g., by the model trainer 215). As another example, when the actual watch time loss regions do not match the predicted watch time loss regions 222, confidence values or weights used by the watch time loss model 206 can be decreased by the model trainer 215, or the watch time loss model 206 can be otherwise adjusted by the model trainer 215, and/or the watch time loss model 206 can be retrained by the model trainer 215 using at least the input video 221.

As another example, in some implementations, the features 216 that are used to train the watch time loss model 206 can be refined over time (i.e., as training progresses) by a feature refiner 230. For instance, feature importance can be calculated by a feature importance calculator 231 for each type of feature that might be included in the features 216 (e.g., various types of video, audio, or semantic features may be included in the features 216). Feature importance can be determined by the feature importance calculator 231 based on which features of the training videos 204 correspond to watch time loss regions identified by the watch time loss region identifier 212, with a higher number of watch time loss regions corresponding to a feature resulting in a higher feature importance and a lower number of watch time loss regions corresponding to the feature resulting in a lower feature importance. Features can be ranked by the feature refiner 230 by a feature importance, and features with a feature importance lower than a threshold can be removed by the feature refiner 230 from the features 216 that are used to train the watch time loss model 206.

As another example, a feature ablation process can be performed by a feature ablater 232. For example, each feature 216 can be iteratively and respectively ablated by the feature ablater 232 (e.g., with noise) in each training video 204. The feature extractor 219 can extract features from each ablated training video (e.g., including ignoring of the ablated feature) and provide the features extracted from each ablated training video to the watch time loss model 206. The feature refiner 230 can compare the predicted watch time loss regions 222 that are generated by the watch time loss model 206 based on the features extracted from an ablated training video to watch time loss regions previously generated by the watch time loss region identifier 212 for a corresponding unablated training video 204. If the predicted watch time loss regions 222 that are generated by the watch time loss model 206 based on the features extracted from an ablated training video are less than (e.g., in count and/or duration) the predicted watch time loss regions for the corresponding unablated training video 204, the feature refiner 230 can determine that the feature that was ablated is important for identifying watch time loss regions. That is, without the feature present, less watch time loss regions were identified. If the predicted watch time loss regions 222 that are generated by the watch time loss model 206 based on the features extracted from an ablated training video are not less than (e.g., in count and/or duration) the predicted watch time loss regions for the corresponding unablated training video 204, the feature refiner 230 can determine that the feature that was ablated is not important for identifying watch time loss regions. That is, watch time loss regions were still identified for the training video even with the feature ablated. Features that are determined to not be important by the feature refiner 230 after ablation can be removed by the feature refiner 230 from the features 216 that are used to train the watch time loss model 206.

Figure 5:
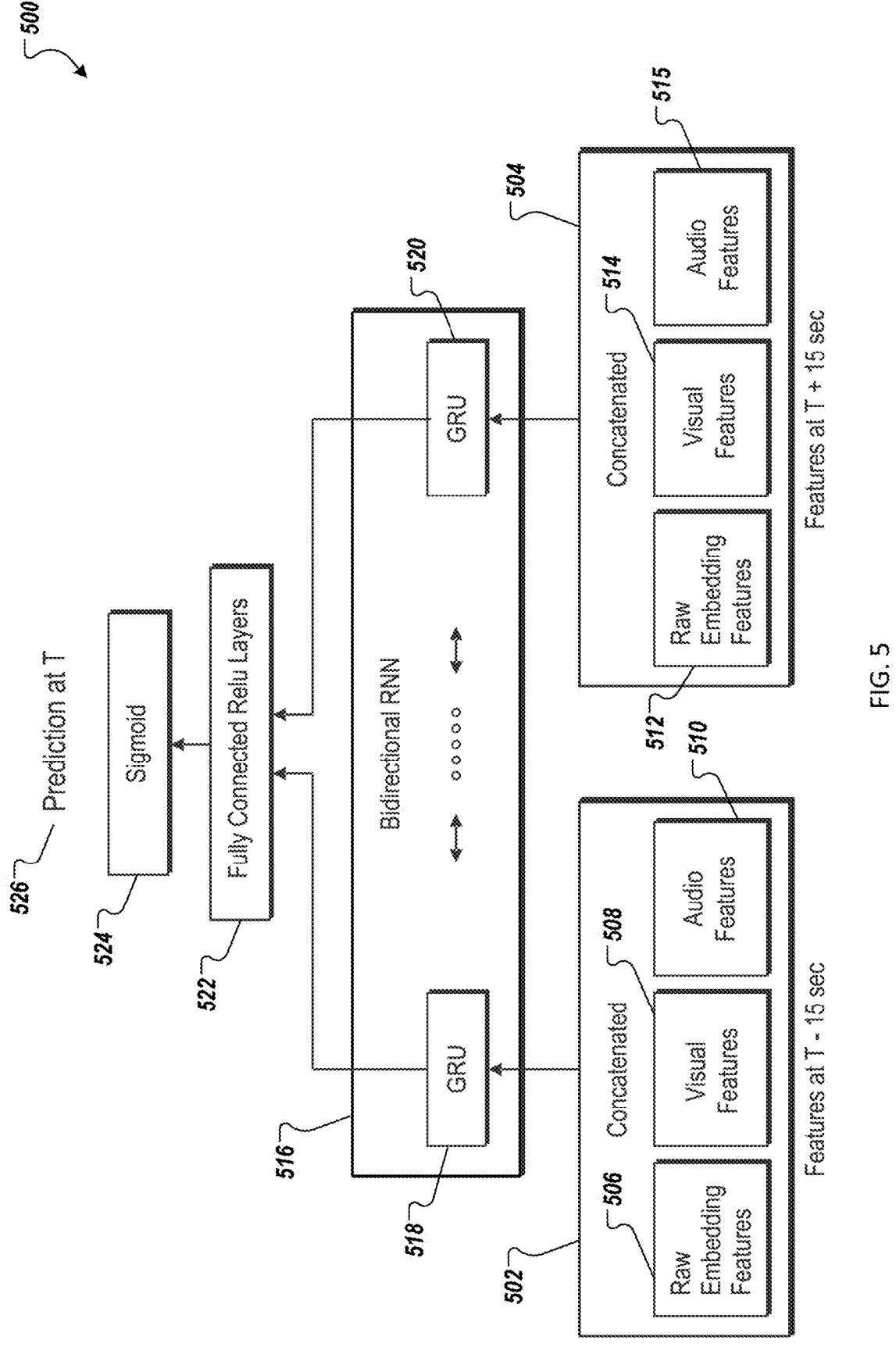
FIG. 5 illustrates an example architecture of a watch time loss model.

FIG. 5 illustrates an example architecture of a watch time loss model 500. The watch time loss model 500 can be the watch time loss model 206 described above with respect to FIG. 2, for example. The watch time loss model 500 includes a bidirectional RNN (Recurrent Neural Network) 516. The bidirectional RNN 516 can include a set of Gated Recurrent Units (GRUs), including a GRU 518 and a GRU 520. For each time T in an input video, concatenated features 502 and 504 can be provided (e.g., by the feature extractor 219) as input to the bidirectional RNN 516 and in particular, to the various GRUs of the bidirectional RNN 516. The concatenated features 502, which can include raw embedding features 506, visual features 508, and audio features 510, include features from, for example, fifteen seconds before the time T to the time T. Similarly, the concatenated features 504, which can include raw embedding features 512, visual features 514, and audio features 515, include features from, for example, time T until fifteen seconds after time T. Although a fifteen second time window is described, other time window lengths (e.g., six seconds, nine seconds, twenty seconds) can be used. Results from practice indicate that selecting a time window both before and after time T can be helpful for model training and prediction by providing more context about the video to the watch time loss model 500. Selecting a time window length can involve tradeoff decisions. Longer time periods may provide more context about the video to the watch time loss model but may require more data for training and/or more model complexity (e.g., more GRUs).

The bidirectional RNN 516 can include a sequence of steps, with each step having features at a one-second time mark in the video. For example, with respect to the fifteen second time window example mentioned above, the bidirectional RNN 516 can include 31 steps (e.g., corresponding to fifteen seconds before time T, time T itself, and fifteen seconds after time T). As another example, in some implementations, the bidirectional RNN 516 can use a LSTM (Long Short-Term Memory) approach.

On top of the bidirectional RNN 516, a fully-connected deep neural network 522 can be used as an additional layer of the watch time loss model 500. For example, output of the GRUs (e.g., a vector of 31 scaler values) of the bidirectional RNN 516 can be fed into fully connected ReLu (Rectified Linear Unit) layers of the fully-connected deep neural network 522. The fully-connected deep neural network 522 can use ReLU as an activation function, for example. Various numbers of layers can be used in the fully-connected deep neural network 522.

An output layer of the watch time loss model 500 can use a sigmoid function 524, which can convert an output from the fully-connected deep neural network 522 to a real-number prediction value 526 between 0 and 1 which represents a likelihood that time T is a watch time loss region in the input video. The larger the prediction value 526, the more likely T is a watch time loss region in the input video. In further detail and as other examples, the sigmoid function 524 can generate a score (e.g., a binary score of 0 or 1, or a score that occurs over a range, such as from 0 to 1) for each region of the input video. The score for each region represents a likelihood of that region being a watch time loss region. If the score for a particular region satisfies (e.g., meets or exceeds) a certain threshold (e.g., 1 or greater than 0.5), the sigmoid function 524 can determine that the particular region is a watch time loss region. On the other hand, if the score for a particular region does not satisfy (e.g., is less than) a certain threshold (e.g., 1 or 0.5), the sigmoid function can determine that the particular region is not a watch time loss region. An administrator can set the certain threshold, for example. As another example, the certain threshold can be automatically determined.

Other types of architectures can be used for the watch time loss model 500. As mentioned a LSTM model can be used rather than GRUs. As another example, in some implementations, both a LSTM model and GRUs can be used.

Figure 6:
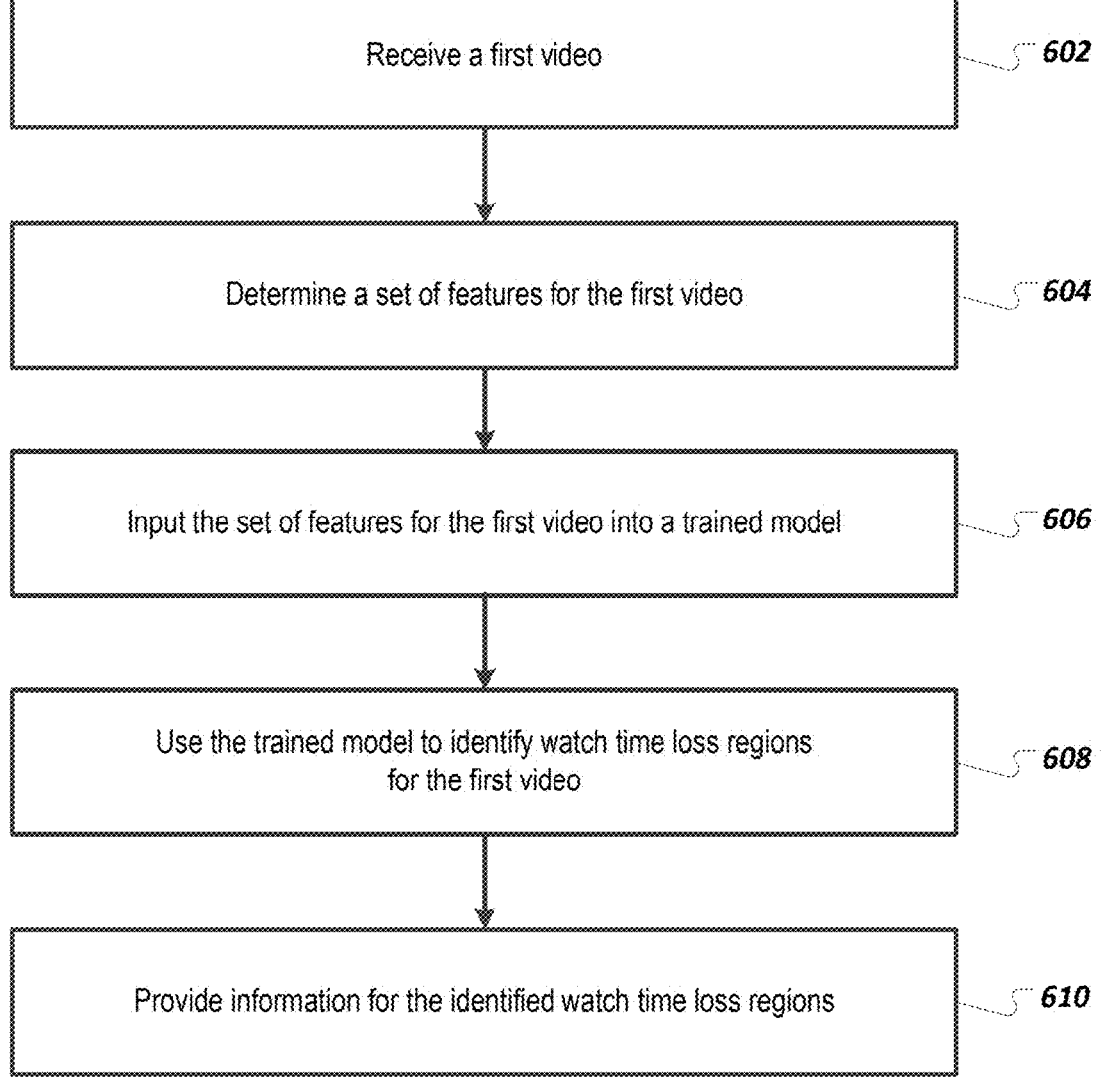
FIG. 6 is a flow diagram of an example process for determining watch time loss regions in media content items.

FIG. 6 is a flow diagram of an example process 600 for determining watch time loss regions in media content items. Operations of the process 600 are described below as being performed by the components of the system described and depicted in FIGS. 1 to 5. Operations of the process 600 are described below for illustration purposes only. Operations of the process 600 can be performed by any appropriate device or system, e.g., any appropriate data processing apparatus. Operations of the process 600 can also be implemented as instructions stored on a computer readable medium which may be non-transitory. Execution of the instructions causes one or more data processing apparatus to perform operations of the process 600.

The video processing system 110 receives a first video (at 602). For instance, as described above with reference to FIG. 2, the input video 221 can be received, such in response to a user input from an administrator selecting the input video 221 or from a batch process that triggers processing of the input video 221 (and other videos). Although video content is described, the process 600 can also be used for other media content, such as audio content.

The video processing system 110 determines a set of features for the first video (at 604). For instance, as described above with reference to FIG. 2, the feature extractor 219 can determine the features 224 of the input video 221. The set of features can include video features, audio features, or semantic features.

The video processing system 110 inputs the set of features for the first video into a trained model (at 606). For instance, as described above with reference to FIG. 2, the features 224 can be provided as input to a trained model such as the watch time loss model 206. As discussed above for the watch time loss model 500, the trained model can be or include a bidirectional recurrent neural network, a fully-connected deep neural network, a LSTM network, and/or other machine learning engines or systems (as described above with reference to FIG. 5). The trained model is trained to output watch time loss regions in a particular video, as described above with reference to FIGS. 2-5 and as summarized below. A watch time loss region for a particular video defines a time window of the particular video in which a likelihood of a user stopping playback of the particular video in the time window is more than a threshold likelihood. The trained model is trained using known watch time loss regions in a plurality of training videos and features of the plurality of training videos that correspond to the known watch time loss regions. For instance, as described above with reference to FIG. 2, the watch time loss model 206 is trained using the labels 214 that are based on watch time loss regions identified by the watch time loss region identifier 212 for the training videos 204 and on the features 216 of the training videos 204.

Training the watch time loss model can include identifying a set of training videos; generating a watch time loss curve for each training video; determining watch time loss regions in each watch time loss curve; and training the trained model using the watch time loss regions in the watch time loss curves. For instance, as described above with reference to FIG. 2, the watch time loss curve generator 210 can generate a watch time loss curve for each of the training videos 204. The watch time loss model 206 can be trained by the model trainer 215 using the labels 214 that are based on watch time loss regions identified in the watch time loss curves by the watch time loss region identifier 212. The watch time loss curve for a particular training video can be generated by the watch time loss curve generator 210 from interaction data from a user activity log that includes, e.g., start and stop times of user viewing sessions for the particular training video. For instance, as described above with respect to FIG. 2, the watch time loss curve generator 210 can generate watch time loss curves based on interaction data in the user activity log 208.

In some implementations, determining watch time regions in a watch time loss curve can include determining an average slope of the watch time loss curve. For example, as described above with respect to FIG. 3, the line 322 depicts the average slope of the watch time loss curve 312. The average slope of a watch time loss curve can correspond to the threshold likelihood that is used to determine a watch time loss region. For example, regions of the watch time loss curve that have a slope that is greater than the average slope can be identified as the watch time loss regions in the watch time loss curve. For example, as described above with respect to FIG. 3, the watch time loss regions 324, 326, and 328 have been identified as watch time loss regions based on having a slope greater than the average slope of the watch time loss curve 312.

In some implementations, a first watch time loss region at the beginning of the watch time loss curve and a last watch time loss region at the end of the watch time loss curve are not used for training the trained model. For example, as described above with respect to FIGS. 2 and 3, watch time loss regions corresponding to the curve portions 318 and 320 are not used for training the watch time loss model 206, despite the slopes of those portions of the watch time loss curve being greater than the average slope.

Training the trained model using the watch time loss regions in the watch time loss curves can include determining, for each watch time loss region determined for a particular training video, features of the particular training video that occur within a predetermined time window of the watch time loss region and training the trained model using the features of the particular training video that occur within the predetermined time window of the watch time loss regions determined for the particular training video. For example, as described above with respect to FIGS. 2 and 3, the feature extractor 219 can generate, as the features 216, features of a training video 204 that are in within the predetermined time window of the watch time loss regions 324, 326, and 328.

The video processing system 110 obtains, from the trained model, data regarding watch time loss regions for the first video (at 608). For instance, as described above with reference to FIG. 2, the watch time loss model 206 can output the predicted watch time loss regions 222 for the input video 221.

The video processing system 110 provides, to an entity involved in providing the first video to a user, data regarding the identified watch time loss regions (at 610). For instance, as described above with reference to FIG. 1, the data regarding the identified watch time loss regions can be provided to a client device 102 of an owner of the first video. As another example, the data regarding the watch time loss regions can be provided to the content provider 108, for determining time points within the first video at which to display digital components. For example, the content provider 108 can determine to schedule presentation of digital components before determined watch time loss regions, as described above with reference to FIG. 1. As yet another example, the content provider 108 can use the data regarding the identified watch time loss regions to determine serving decisions for when to provide digital components to a client device 102. For example, a first set of digital components that is scheduled to be played before a determined watch time loss region may be sent to the client device 102 on a priority basis (e.g., before the first set of digital components is scheduled to be played and possibly even with the provision of the video) and a second set of digital components that is scheduled to be played after a first determined watch time loss region may be configured (e.g., by the content provider 108) to be provided on an on-demand basis (e.g., right when the digital component is scheduled to be played). That is, since some users may tend to stop watching the video during the first determined watch time loss region, the content provider 108 can provide certain high priority digital components before the first watch time loss region and lower priority digital components before each subsequent watch time loss region.

The data regarding the watch time loss regions that is provided to the client device 102 of the owner of the first video can be presented as quality information for the first video. The quality information can indicate a count and/or duration of determined watch time loss regions for the first video. If the quality information indicates a low or otherwise unacceptable quality (e.g., a count or duration of watch time regions being higher than a predetermined threshold), the owner can use the information for the watch time loss regions to adjust those portions of the first video, and re-upload the first video (e.g., to the content platform 106) as an updated version of the first video. The video processing system 110 can process the updated version of the first video using the trained model to generate updated watch time loss information for the updated version of the first video and provide the updated watch time loss information for the updated version of the first video to the owner of the first video. The owner can repeat the adjusting and uploading until an acceptable level of quality is reached.

FIG. 7 is block diagram of an example computer system 700 that can be used to perform operations described above. The system 700 includes a processor 710, a memory 720, a storage device 730, and an input/output device 740. Each of the components 710, 720, 730, and 740 can be interconnected, for example, using a system bus 750. The processor 710 is capable of processing instructions for execution within the system 700. In some implementations, the processor 710 is a single-threaded processor. In another implementation, the processor 710 is a multi-threaded processor. The processor 710 is capable of processing instructions stored in the memory 720 or on the storage device 730.

The memory 720 stores information within the system 700. In one implementation, the memory 720 is a computer-readable medium. In some implementations, the memory 720 is a volatile memory unit. In another implementation, the memory 720 is a non-volatile memory unit.

The storage device 730 is capable of providing mass storage for the system 700. In some implementations, the storage device 730 is a computer-readable medium. In various different implementations, the storage device 730 can include, for example, a hard disk device, an optical disk device, a storage device that is shared over a network by multiple computing devices (e.g., a cloud storage device), or some other large capacity storage device.

The input/output device 740 provides input/output operations for the system 700. In some implementations, the input/output device 740 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to peripheral devices 760, e.g., keyboard, printer and display devices. Other implementations, however, can also be used, such as mobile computing devices, mobile communication devices, set-top box television client devices, etc.

Although an example processing system has been described in FIG. 7, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   receiving a request for a first video;
   identifying watch time loss information for the first video comprising one or more watch time loss regions,
   wherein a watch time loss region specifies a time window of the first video during which video playback is expected to be stopped;
   identifying one or more content items to be provided with the first video;
   determining, based on the watch time loss information, for each content item of the one or more content items, a placement position in the first video at which to present the content item, comprising determining first placement positions that are before a first watch time loss region for a first set of higher priority content items and second placement positions that are after the first watch time loss region for a second set of lower priority content items;
   configuring presentation of the first video so that the one or more content items are presented at respective placement positions identified based on the watch time loss information; and
   transmitting, in response to the request, the first video and the one or more content items based on the first placement positions and the second placement positions.

2. The computer-implemented method of claim 1, wherein determining, based on the watch time loss information, for each content item of the one or more content items, a placement position in the first video at which to present the content item comprises determining a first placement position for a first content item that is before a first watch time loss region.

3. The computer-implemented method of claim 2, wherein configuring presentation of the first video so that the first content item is presented at the first placement position increases a likelihood of presentation of the first content item as compared to presenting the first content item at a second placement position that is after the first watch time loss region.

4. The computer-implemented method of claim 1, further comprising using the watch time loss information for the first video to determine serving decisions for when to provide content items to a client device during playback of the first video.

5. The computer-implemented method of claim 4, wherein content items of the first set of content items are provided with the first video in response to the request.

6. The computer-implemented method of claim 4, wherein content items of the second set of content items are provided on an on-demand basis during playback of the first video in response to determining that the playback is approaching respective second placement positions.

7. The computer-implemented method of claim 1, wherein the watch time loss information for the first video is determined using a trained model that is trained to output one or more watch time loss regions in an input video.

8. The computer-implemented method of claim 7, wherein determining the watch time loss information for the first video using the trained model comprises:
   determining a set of features for the first video;
   inputting the set of features for the first video into the trained model; and
   in response to inputting the set of features for the first video into the trained model, obtaining, from the trained model, watch time loss region data for the first video.

9. The computer-implemented method of claim 8, wherein training the trained model comprises:
   for each training video in a plurality of training videos:

generating a watch time loss curve for the training video;

determining watch time loss regions in the watch time loss curve; and training the trained model using the watch time loss regions in watch time loss curves for the plurality of training videos.

10. The computer-implemented method of claim 9, wherein determining watch time loss regions in the watch time loss curve comprises:

determining an average slope of the watch time loss curve; and determining, as the watch time loss regions in the watch time loss curve, regions of the watch time loss curve that have a slope that is greater than the average slope.

11. The computer-implemented method of claim 10, wherein training the trained model using the watch time loss regions in the watch time loss curves for the plurality of training videos comprises training the trained model using watch time loss regions other than a first watch time loss region at a beginning of the watch time loss curve and a last watch time loss region at an end of the watch time loss curve.

12. The computer-implemented method of claim 9, wherein training the trained model using the watch time loss regions in the watch time loss curves comprises:

determining, for each watch time loss region determined for a particular training video, features of the particular training video that occur within a predetermined time window of the watch time loss region; and training the trained model using determined features of the particular training video.

13. The computer-implemented method of claim 9, wherein the watch time loss curve for a particular training video is generated from interaction data obtained from a user activity log that includes start and stop times of user viewing sessions for the particular training video.

14. The computer-implemented method of claim 9, wherein the trained model comprises a bidirectional recurrent neural network and a fully-connected deep neural network.

15. The computer-implemented method of claim 9, wherein the set of features for the first video and features of the plurality of training videos comprise video features, audio features, or semantic features.

16. A system, comprising:

one or more memory devices storing instructions; and one or more data processing apparatus that are configured to interact with the one or more memory devices, and upon execution of the instructions, perform operations comprising:

receiving a request for a first video;

identifying watch time loss information for the first video comprising one or more watch time loss regions, wherein a watch time loss region specifies a time window of the first video during which video playback is expected to be stopped;

identifying one or more content items to be provided with the first video;

determining, based on the watch time loss information, for each content item of the one or more content items, a placement position in the first video at which to present the content item, comprising determining first placement positions that are before a first watch time loss region for a first set of higher priority content items and second placement positions that are after the first watch time loss region for a second set of lower priority content items;

configuring presentation of the first video so that the one or more content items are presented at respective placement positions identified based on the watch time loss information; and transmitting, in response to the request, the first video and the one or more content items based on the first placement positions and the second placement positions.

17. The system of claim 16, wherein determining, based on the watch time loss information, for each content item of the one or more content items, a placement position in the first video at which to present the content item comprises determining a first placement position for a first content item that is before a first watch time loss region.

18. A non-transitory computer readable medium storing instructions that, when executed by one or more data processing apparatus, cause the one or more data processing apparatus to perform operations comprising:

receiving a request for a first video;

identifying watch time loss information for the first video comprising one or more watch time loss regions, wherein a watch time loss region specifies a time window of the first video during which video playback is expected to be stopped;

identifying one or more content items to be provided with the first video;

determining, based on the watch time loss information, for each content item of the one or more content items, a placement position in the first video at which to present the content item, comprising determining first placement positions that are before a first watch time loss region for a first set of higher priority content items and second placement positions that are after the first watch time loss region for a second set of lower priority content items;

configuring presentation of the first video so that the one or more content items are presented at respective placement positions identified based on the watch time loss information; and transmitting, in response to the request, the first video and the one or more content items based on the first placement positions and the second placement positions.

* * * * *